(12) United States Patent
Mani et al.

(10) Patent No.: US 10,530,860 B2
(45) Date of Patent: Jan. 7, 2020

(54) SINGLE MULTI-INSTANCE TENANT COMPUTING SYSTEM

(71) Applicant: Microsoft Technology Licensing, LLC, Redmond, WA (US)

(72) Inventors: Seshadri Mani, Redmond, WA (US); Murli D. Satagopan, Kirkland, WA (US); Hongzhou Ma, Redmond, WA (US); Ziyi Wang, Redmond, WA (US); Naresh Kannan, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 272 days.

(21) Appl. No.: 15/639,518

(22) Filed: Jun. 30, 2017

(65) Prior Publication Data
US 2019/0007494 A1 Jan. 3, 2019

(51) Int. Cl.
*H04L 29/08* (2006.01)
*H04L 29/06* (2006.01)
*H04L 12/24* (2006.01)

(52) U.S. Cl.
CPC ...... *H04L 67/1097* (2013.01); *H04L 41/5041* (2013.01); *H04L 41/5048* (2013.01); *H04L 63/104* (2013.01); *H04L 67/10* (2013.01); *H04L 67/30* (2013.01)

(58) Field of Classification Search
CPC .............. H04L 63/104; H04L 41/5048; H04L 41/5041
See application file for complete search history.

(56) References Cited

U.S. PATENT DOCUMENTS 9,027,020 B2  5/2015  Edholm et al.
9,384,362 B2  7/2016  Cabrera et al.
(Continued)

FOREIGN PATENT DOCUMENTS

WO  2014018875 A1  1/2014

OTHER PUBLICATIONS

"Multiple online instances or tenants", https://technet.microsoft.com/en-us/library/dn722373.aspx, Retrieved on: May 23, 2017, 7 pages.
(Continued)

*Primary Examiner* — David R Lazaro
(74) *Attorney, Agent, or Firm* — Christopher J. Volkmann; Kelly, Holt & Christenson, PLLC

(57) ABSTRACT

Directory information and content for two separate tenants are merged by identifying a first of tenants as a hub tenant and a second of the tenants as a satellite tenant. The hub tenant is modified to include two instances, or data containers, one instance for the hub tenant and another instance for the satellite tenant. Directory merger logic re-associates identity account items in the satellite instance, with the hub instance, by replacing a tenant identifier in the identity account items of the satellite instance with a tenant identifier corresponding to the hub instance. Unique identifiers for users of the satellite instance are maintained unchanged. Content merger logic re-associates content items of the satellite instance with the hub instance by setting a tenant identifier for all satellite content items to the tenant identifier corresponding to the hub instance. A tenant identifier corresponding to backend services that support the content items can be updated to the tenant identifier corresponding to the hub instance as well.

20 Claims, 9 Drawing Sheets

(56) References Cited

U.S. PATENT DOCUMENTS

| | | | |
|---|---|---|---|
| 9,774,586 B1* | 9/2017 | Roche | H04L 63/08 |
| 9,992,186 B1* | 6/2018 | Drozd | H04L 63/0807 |
| 10,009,337 B1* | 6/2018 | Fischer | H04L 63/105 |
| 10,044,723 B1* | 8/2018 | Fischer | H04L 63/102 |
| 2017/0099181 A1 | 4/2017 | Hawking et al. | |
| 2018/0083835 A1* | 3/2018 | Cole | H04L 41/0866 |
| 2018/0083967 A1* | 3/2018 | Subramanian | G06F 8/65 |
| 2018/0314723 A1* | 11/2018 | Frantz, III | G06F 16/211 |
| 2018/0351832 A1* | 12/2018 | Coburn | H04L 41/5048 |
| 2019/0007494 A1* | 1/2019 | Mani | H04L 67/1097 |
| 2019/0102162 A1* | 4/2019 | Pitre | G06F 8/65 |

OTHER PUBLICATIONS

Goodman. Steve, "Combine Office 365 tenants after a merger or acquisition", http://searchexchange.techtarget.com/tip/Combine-Office-365-tenants-after-a-merger-or-acquisition, Published on: Aug. 2014, 4 pages.

Petruzzella, Amykelly, "Challenges of merging messaging between tenants of Office 365", https://www.binarytree.com/blog/2017/may/challenges-of-merging-messaging-between-tenants-of-office-365/, Published on: May 16, 2017, 5 pages.

Black, et al,: "Problem Statement: Overlays for Network Virtualization", https://tools.ietf.org/html/draft-ietf-nvo3-overlay-problem-statement-04, Published on: Jul. 31, 2013. pp. 1-24.

Franghiu, Lucian, "Real world Azure AD Connect: the case for TWO Azure AD Connect servers", https://blog.kloud.com.au/tag/azure-ad/, Published on: Dec. 6, 2016, 31 pages.

Romo, Adrian, "Mergers and Acquisitions with Office 365 Part 1: Active Directory Consolidation", https://www.credera.com/blog/technology-insights/open-source-technology-insights/mergers-and-acquisitions-with-office-365-part-1-active-directory-consolidation/, Published on: Apr. 26, 2016, 2 pages.

\* cited by examiner

SINGLE MULTI-INSTANCE TENANT COMPUTING SYSTEM

BACKGROUND

Computing systems are currently in wide use. Some computing systems include multi-tenant computing systems where services are hosted for multiple different tenants or user organizations.

In such systems, it is common for each tenant to have a directory system (or user account system) which is used by an administrative user to manage user accounts for a given tenant. The user accounts may include information such as usernames, passwords, authentication information, permissions associated with the user, and other information. The users are often associated with a particular tenant by having their user record include a tenant identifier. The users may also be associated with a particular domain in the user account system as well.

Also, such computing systems also have content management systems which may, themselves, use backend services to manage content for a tenant. Content management systems can take a wide variety of different forms, but may include data storage systems, document sharing and management systems, among a wide variety of others.

The discussion above is merely provided for general background information and is not intended to be used as an aid in determining the scope of the claimed subject matter.

SUMMARY

Directory information and content for two separate tenants are merged by identifying a first of tenants as a hub tenant and a second of the tenants as a satellite tenant. The hub tenant is modified to include two instances, or data containers, one instance for the hub tenant and another instance for the satellite tenant. Directory merger logic re-associates identity account items in the satellite instance, with the hub instance, by replacing a tenant identifier in the identity account items of the satellite instance with a tenant identifier corresponding to the hub instance. Unique identifiers for users of the husband satellite instances are maintained unchanged. Content merger logic re-associates content items of the satellite instance with the hub instance by setting a tenant identifier for all satellite content items to the tenant identifier corresponding to the hub instance. A tenant identifier corresponding to backend services that support the content items can be updated to the tenant identifier corresponding to the hub instance as well.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

It is currently quite common for tenants (or organizations) that use hosted services to merge with one another or to divest from one another. These types of scenarios can be quite difficult to manage. For instance, where one tenant merges with another, the superset of users of both tenants will wish to be able to see one another, in the hosted service, and to share content with one another. Current services do not allow for multiple-instance tenants. The present description however, describes a multi-instance tenant computing system and how multiple instances can be created for a single tenant. While the present discussion is directed to merging two tenants into a single, multi-instance tenant, it will be appreciated that the multiple instances can be created for other reasons as well, such as to add another instance (data container) for a single tenant to increase capacity. These are examples only.

Figure 1:
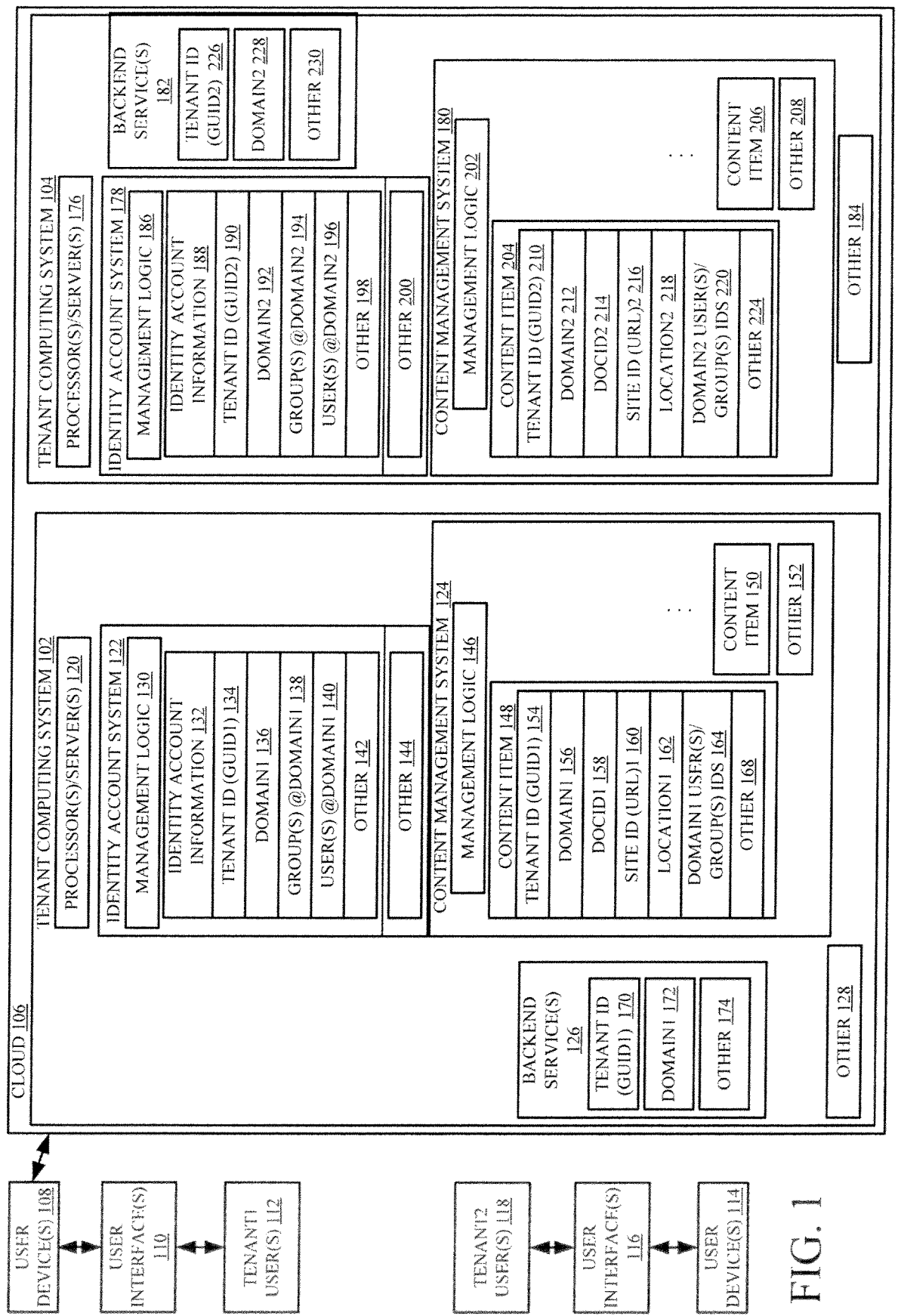
FIG. 1 is a block diagram showing one example of a cloud-based multi-tenant computing system in which two separate tenants use a hosted service.

FIG. 1 shows one example of a cloud-based computing system in which two, separate, tenant computing systems 102 and 104 are deployed in cloud 106. FIG. 1 also shows that, in one example, tenant computing system 102 illustratively communicates with user devices 108 which generate user interfaces 110 for interaction by tenant 1 users 112. Tenant 1 users 112 illustratively interact with user input mechanisms on user interfaces 110 in order to control and manipulate user device 108 and ultimately parts of tenant computing system 102. In addition, FIG. 1 shows that tenant computing system 104 illustratively communicates with user devices 114 which generate user interfaces 116 for interaction by tenant 2 users 118. Tenant 2 users 118 illustratively interact with user input mechanisms on user interfaces 116 in order to control and manipulate user device 114 and parts of tenant computing system 104.

FIG. 1 shows that, in one example, tenant computing system 102 includes one or more processors or servers 120, identity account system 122, content management system 124, backend services 126, and it can include other items 128. Identity account system 122 is illustratively used to manage accounts or a directory of users for tenant computing system 102. Therefore, it illustratively includes management logic 130 that can expose interfaces for use by an administrative user of tenant computing system 102 in order to manage identity account information 132 for tenant computing system 102. It can include other items 144 as well. The identity account information can be associated with a first tenant identifier 134 (which may be GUID 1), with a domain 136, it may identify certain groups 138 and users 140. Each user illustratively has a unique user identifier. The identity account information may include a wide variety of other identity or directory information 142 as well.

Content management system 124 can, itself, include management logic 146. Logic 146 illustratively exposes interfaces that allow users of tenant computing system 102 to interact with and manage content items 148-150 in content management system 124. Content management system 124 can include other items 152, as well.

In one example, each of the content items 148-150 is also associated with a tenant by tenant identifier 154 (which may be GUID 1 for a first tenant). Each content item 148 may have an associated domain 156, a document identifier 158, a site identifier (or URL) 160, a physical location 162 where the content item may be stored, a set of Domain 1 users and groups that are identified by user and group identifiers 164. Each content item 148-150 can of course include other information 168 as well.

Also, as shown in FIG. 1, the backend services 126 used by tenant computing system 102 can be associated with the tenant as well. This can be done, again, using a tenant identifier 170 (which may be GUID 1) as well as a domain identifier 172. The backend services 126 can include other items 174 as well.

Tenant computing system 104 can be similar to tenant computing system 102. Therefore, it can also include a set of processors or servers 176, an identity account system 178, content management system 180, backend services 182, and it can include a wide variety of other items 184. The identity account system 178 can, itself, include management logic 186 and identity account information 188. Information 188 can be associated with another tenant by tenant ID 190 (GUID 2), a second domain 192, groups 194 corresponding to the domain of the second tenant, users 196 corresponding to the domain of the second tenant, and it can include other items 198. Identity account system 178 can also include other items 200.

Content management system 180, as with content management system 124, can include management logic 202 and content items 204-206. It can include other items 208 as well. Each content item 204-206 can be associated with a tenant using a tenant identifier 210 (e.g., GUID 2), domain identifier 212, document identifier 214, site identifier (or URL) 216, location 218, user(s)/group(s) identifiers 220, service instances 222, and it can include other items 224.

Backend services 182 can also be associated with a tenant by tenant identifier 226 (e.g., GUID 2) and domain identifier 228. It can include other items 230, as well.

Computing system 240 can be in the cloud 106 illustrated in FIG. 1 or in a different environment. It can thus be appreciated that merging the tenant computing system 104 with tenant computing system 102 can be quite difficult. Each of the tenant computing systems, in current scenarios, often support only a single instance (or data container) per tenant. This exacerbates the difficulties associated with merging tenants, or even with growing a single tenant by adding a data container for that tenant.

Figure 2:
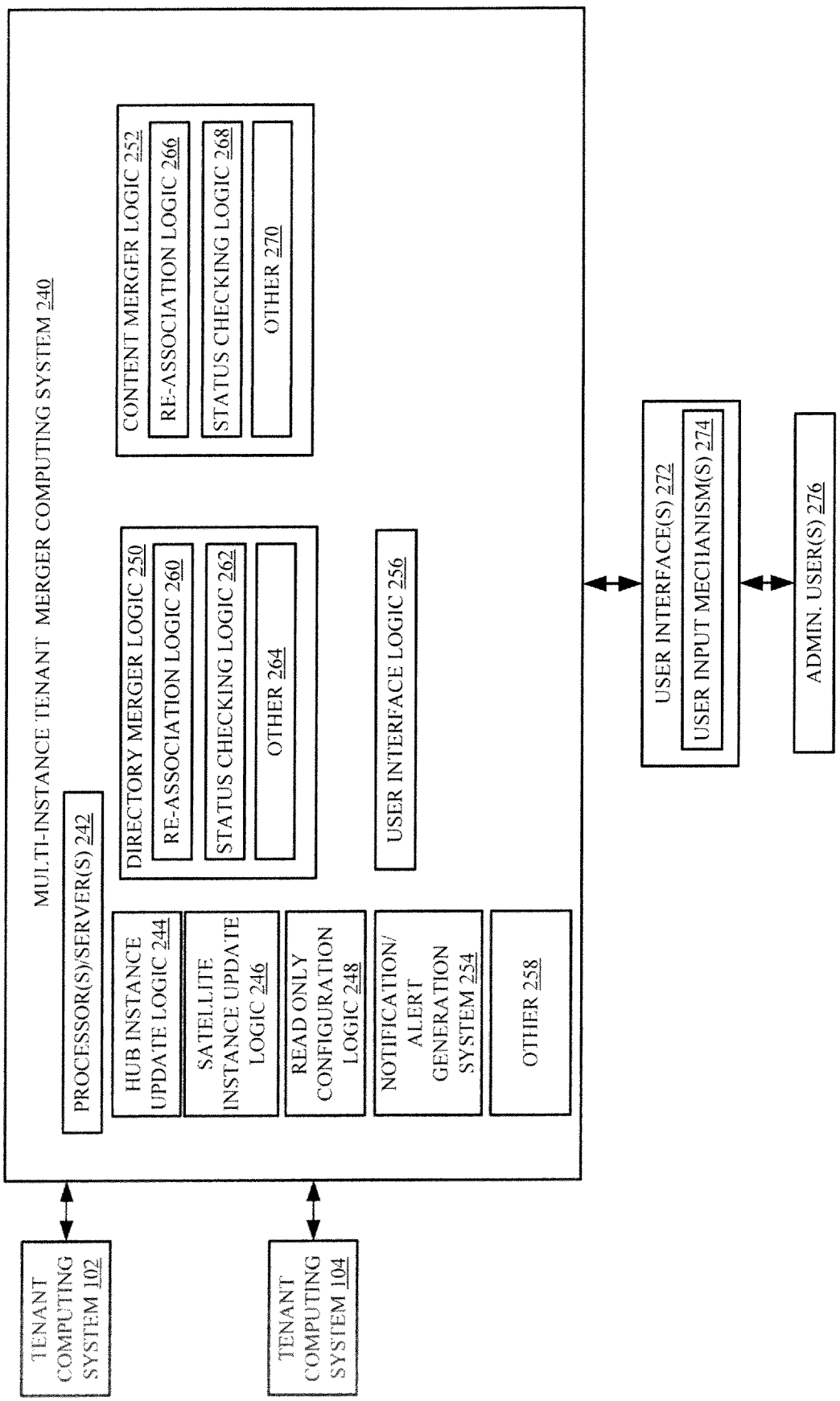
FIG. 2 is a block diagram showing one example of a multi-instance tenant merger computing system.

FIG. 2 shows one example of a multi-instance tenant merger computing system 240.

FIG. 2 shows that computing system 240 can have access to tenant computing systems 102 and 104. It can include a set of processors or servers 242, hub instance update logic 244, satellite instance update logic 246, read only configuration logic 248, directory merger logic 250, content merger logic 252, notification/alert generation system 254, user interface logic 256, and it can include other items 258. In the example shown in FIG. 2, directory merger logic 250 can include re-association logic 260, status checking logic 262, and it can include other items 264. Content merger logic 252 can also include re-association logic 266, status checking logic 268, and it can include other items 270.

FIG. 2 shows that, in one example, user interface logic 256 of computing system 240 illustratively generates user interfaces 272 with user input mechanisms 274 for interaction by an administrative user 276. Administrative user 276 illustratively interacts with user input mechanisms 274 in order to control and manipulate multi-instance tenant merger computing system 240. It will be noted that interfaces 272 can be generated for multiple different administrative users 276. Such administrative users can be global administrative users that have administrative access to both tenant computing systems 102 and 104. They can also be more local administrative users which may have administrative access to either tenant computing system 102 or 104, but not both. All of these are contemplated herein. Before describing the overall operation of multi-instance tenant merger computing system 240 in more detail, a brief overview of some of the items in computing system 240, and their operation, will first be provided.

Hub instance update logic 244 illustratively exposes an interface that allows administrative user 276 to update instance information for a hub tenant when a merger of tenant computing systems 102 and 104 is to take place. For purposes of the present description, it will be assumed that tenant computing system 102 is the hub tenant computing system. Satellite instance update logic 246 illustratively exposes an interface that allows administrative user 276 to update instance information corresponding to the satellite tenant (in this case tenant computing system 104). Read only configuration logic 248 illustratively detects a trigger input by an administrative user, or by another system, and configures the satellite instance (e.g., tenant computing system 104) so that its directory information is in a read only state. When the directory information has been re-associated to the hub instance (as described below), or when this is nearly complete, a trigger is generated to place the content information in a read only state as well, while it is re-associated to the hub instance. That way, the users 118 of tenant computing system 104 can still access the information, even while tenant computing system 104 is being merged with tenant computing system 102.

Directory merger logic 250 detects a merge trigger input by an administrative user or another system, and begins merging the identity account systems 122 (for tenant computing system 102) and 178 (for tenant computing system 104). Re-association logic 260 illustratively re-associates the identities (e.g., users and groups) in the satellite instance (tenant computing system 104) with the hub instance (tenant computing system 102). Status checking logic 262 monitors the status of the merger to determine when it is complete. Once it is complete (or nearly complete), it triggers read only configuration logic 248 to place the content information in system 180 in a read only state and it also triggers content merger logic 252 to begin merging the content items in content management system 180 (in tenant computing system 104) with those in content management system 124 (of tenant computing system 102). Re-association logic 266 illustratively re-associates the content items from the satellite instance to the hub instance (e.g., from tenant computing system 104 to tenant computing system 102), and status checking logic 268 checks the status of the merger in order to identify when it is completed. Notification/alert generation system 254 can generate a notification or alert if either of the merger processes fails, or when they are complete. This can be used by user interface logic 256 to surface the notification or alert for administrative user 276. It can also be used to notify the users of tenant computing systems 102 and 104 that the merger is complete.

Figure 3A:
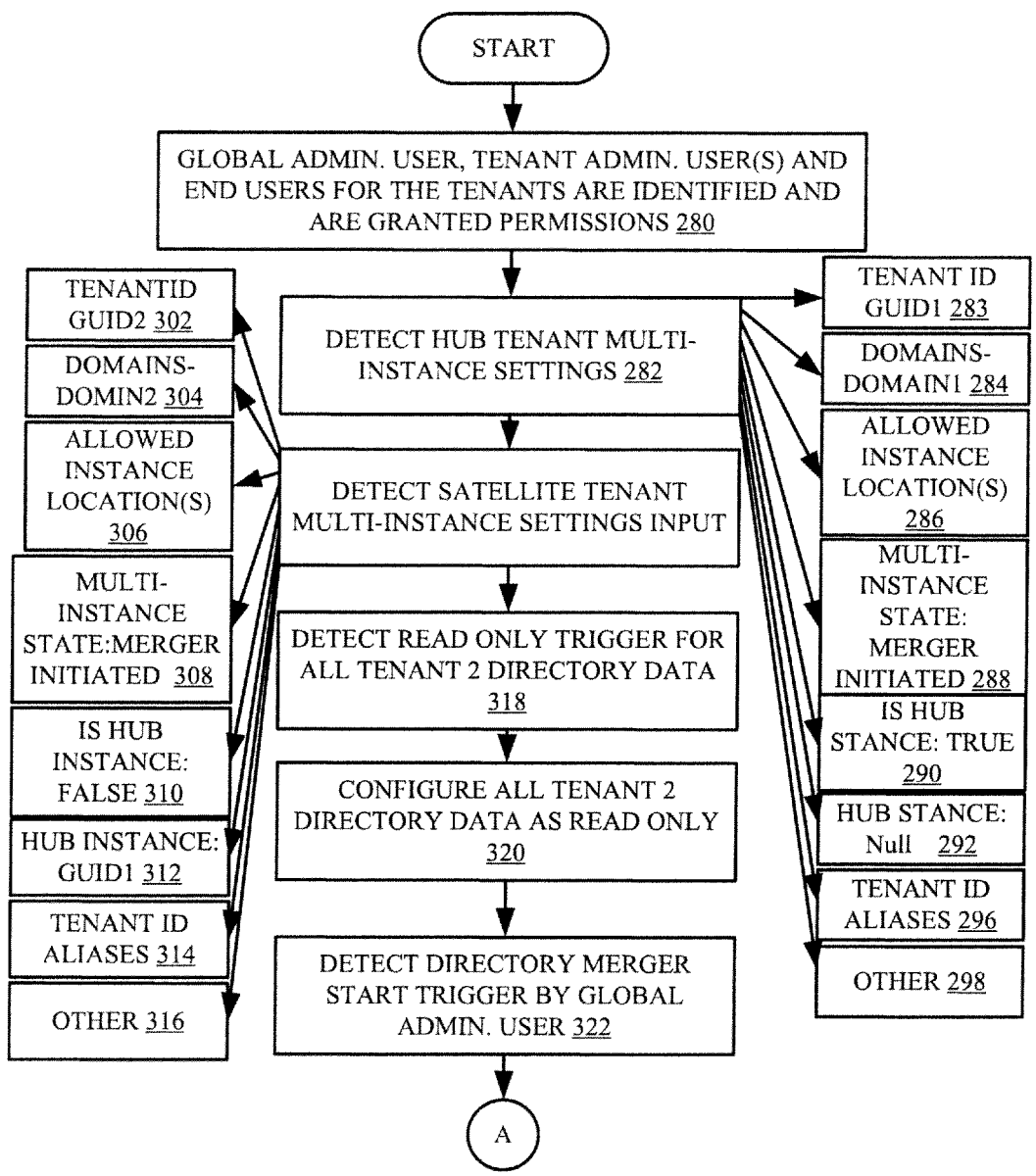
FIGS. 3A and 3B (collectively referred to herein as FIG. 3) illustrate a flow diagram showing one example of how the tenants illustrated in FIG. 1 are merged together.
Figure 3B:
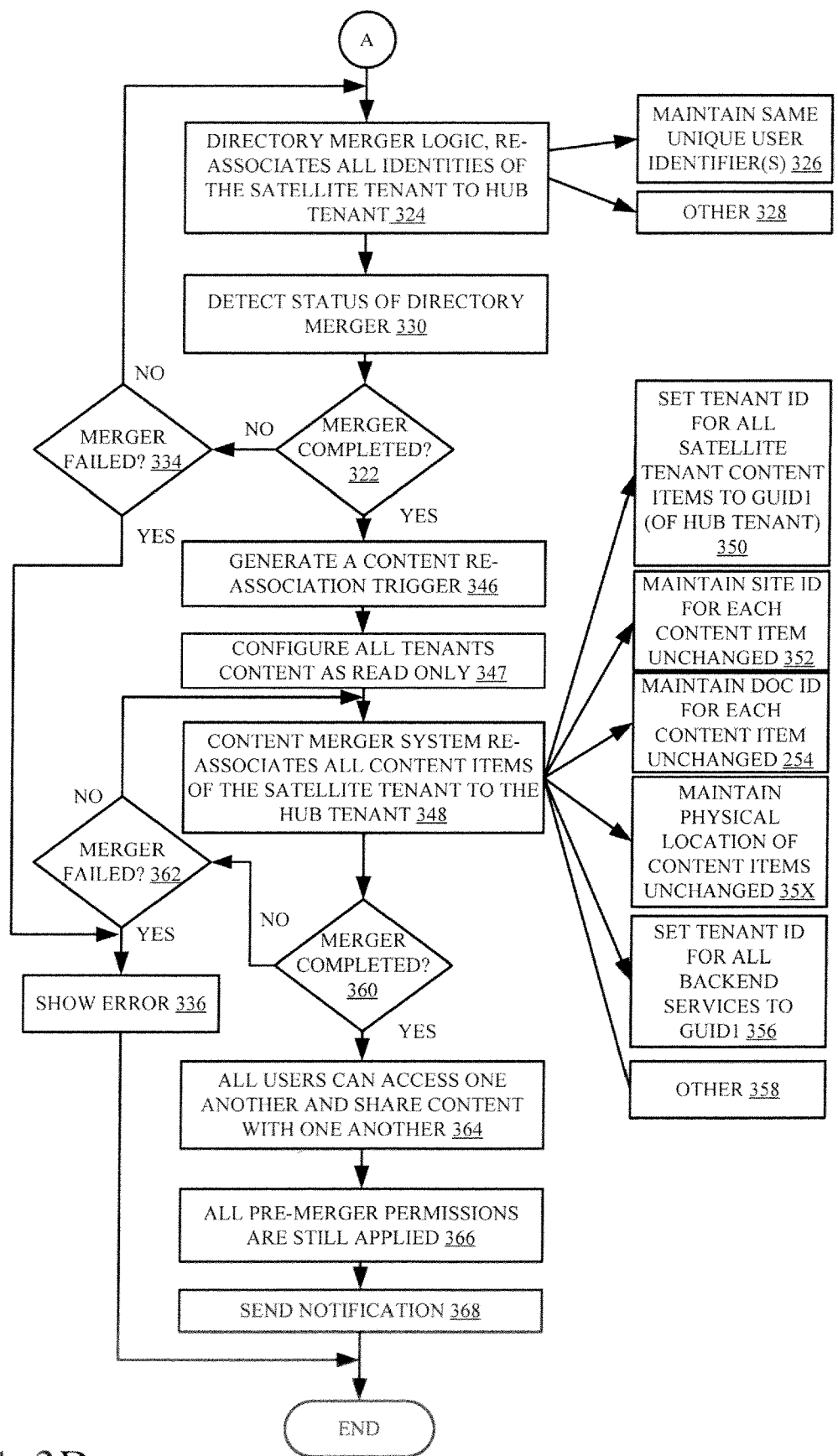

FIGS. 3A and 3B (collectively referred to herein as FIG. 3) show a flow diagram illustrating one example of the operation of the multi-instance tenant merger computing system 240 illustrated in FIG. 3 in generating a multi-instance tenant computing system that merges tenant computing systems 102 and 104. It is first assumed that a global administrative user has obtained rights to perform administrative operations in both tenant computing systems 102 and 104. In addition, tenant administrative users and end users for those tenants have all been identified and are granted permissions appropriate to them. For instance, the administrative user for a particular tenant computing system has the permissions associated with administrative operations in that computing system. End users have permissions for communicating with one another and manipulating and viewing content items in the corresponding tenant computing system. These and other permissions are contemplated herein. This is indicated by block 280 in the flow diagram of FIG. 3.

At some point, hub instance update logic 244 provides tenant settings regarding the hub instance. Some settings can be automatically set by logic 244, and some can be input. For instance, the global administrative user (it will be assumed for the sake of the present description that administrative user 276 is a global administrative user) can provide an input through an interface exposed by hub instance update logic 244 to provide multi-instance tenant settings identifying the hub instance (again, for the purposes of the present description it will be assumed that tenant computing system 102 is the hub instance). Providing the multi-instance settings to identify the hub instance is indicated by block 282 in the flow diagram of FIG. 3. The multi-instance settings can include a wide variety of items. As an example, they can include a tenant identifier (such as GUID 1) as indicated by block 283. They can include a domain corresponding to Tenant 1, as indicated by block 284. They can include instance locations that are allowed to store content for Tenant 1, as indicated by block 286. They can include a multi-instance state variable 288 which indicates where, in the merger process, the tenant is. In one example, logic 244 sets the value for the multi-instance state variable to "merger initiated". Logic 244 also sets a value for IsHubInstance variable 290. The IsHubInstance variable 290 will be set, for tenant computing system 102, to true because tenant computing system 102 will act as a hub instance into which the satellite instance (tenant computing system 104) will be merged.

The administrative user 276 also illustratively sets a value for the HubInstance variable 292. HubInstance variable 292 identifies a hub instance for a satellite instance. Therefore, the HubInstance variable 292 has a value that is set, for tenant computing system 102, to null, because tenant computing system 102 is, itself, a hub instance.

Administrative user 276 also illustratively sets any aliases for the present tenant as indicated by block 296. The hub multi-instance settings can include a wide variety of other information a well, and this is indicated by block 298.

Satellite instance update logic 246 also exposes an interface that generates settings regarding the satellite instance. The settings can be automatically generated on input. For instance, logic 246 illustratively allows global administrative user 276 to input satellite multi-instance settings. This is indicated by block 300 in the flow diagram of FIG. 3. The settings can be similar to those set in the hub instance, or different. In one example, they include a tenant identifier 302 (which may be GUID 2), a domain identifier (which may be Domain 2) as indicated by block 304, allowed instance locations 306, a multi-instance state variable 308 (which again, may be set to "merger initiated"), values for the IsHubInstance variable 310 and the HubInstance variable 312. For variable 310, the IsHubInstance value is set to "false", because tenant computing system 104 is a satellite instance. The HubInstance variable 312 is set to "GUID 1" which is the tenant identifier for tenant computing system 102, which is the hub instance for the satellite instance of tenant computing system 104. Logic 244 can also identify and set any aliases for this tenant, as indicated by block 314, and a wide variety of other information as well, as indicated by block 316.

Prior to beginning the merger process, an administrative user of tenant computing system 104 illustratively provides an input detected by read only configuration logic 248. The input triggers read only configuration logic 248 to configure the identity account information in tenant computing system 104 to read only. In this way, users 118 can still access those items in tenant computing system 104, and the content items, even while the merger is taking place, but no new identity account information will be added or deleted, while that information is being re-associated. Detecting a read only trigger for all of the directory data in tenant computing system 104 is indicated by block 318. Configuring all of the directory data as read only for tenant computing system 104 is indicated by block 320.

Directory merger logic 250 then detects a directory merge start trigger. This may be input through an exposed interface by global administrative user 276, or in other ways. Detecting the trigger is indicated by block 322 in the flow diagram of FIG. 3.

Re-association logic 260 in directory merge logic 250 then begins to re-associate all of the identities 188-189 (e.g., the users and user groups) in tenant computing system 104 (the satellite instance) to tenant computing system 102 (the hub instance). This is indicated by block 324. In doing so, it changes the tenant ID, associated with all of the identities, to the tenant ID for tenant computing system 102 (e.g., GUID 1). Where the global administrative user wishes for the tenant computing system 104 to retain its domain and URL, it lists both domains (those for tenant computing system 102 and tenant computing system 104), in the identity account information. It also includes a superset of users and user groups for both domains (e.g., the users and user groups that were identified in tenant computing system 102 and those identified in tenant computing system 104). That is, it generates a superset of all users and user groups of both tenant computing systems and places it in a merged identity account system.

It will be noted that, in one example, the unique user identifiers associated with the users of both tenant computing systems 102 and 104 are maintained. This is indicated by block 326. Therefore, all of the permissions that were previously granted to the individual users of the two tenant computing systems 102 and 104 will follow them into the merged system without needing any changes or updates. This is because the content items may set permissions based upon user identity, and since the unique user identifiers are maintained, the permissions need not be updated or changed in any way, in order for the same permissions to still be applied in the merged system as were applied in both isolated tenant computing systems, before the merger. The identity account information can be merged in other ways as well, and this is indicated by block 328.

At some point, status checking logic 262 detects that the last of the identity account information has been re-associated with the hub tenant (tenant computing system 102). Detecting whether the merger of the directory information is complete is indicated by block 330. If not, as indicated by block 332, then status checking logic 262 determines whether the merger has failed, as indicated by block 334. If so, an error message is generated as indicated by block 336. However, if the merger is not yet complete but it has not failed, then processing reverts to block 324 where re-association logic 260 continues to re-associate all of the identities of the satellite tenant to the hub tenant.

Figure 4:
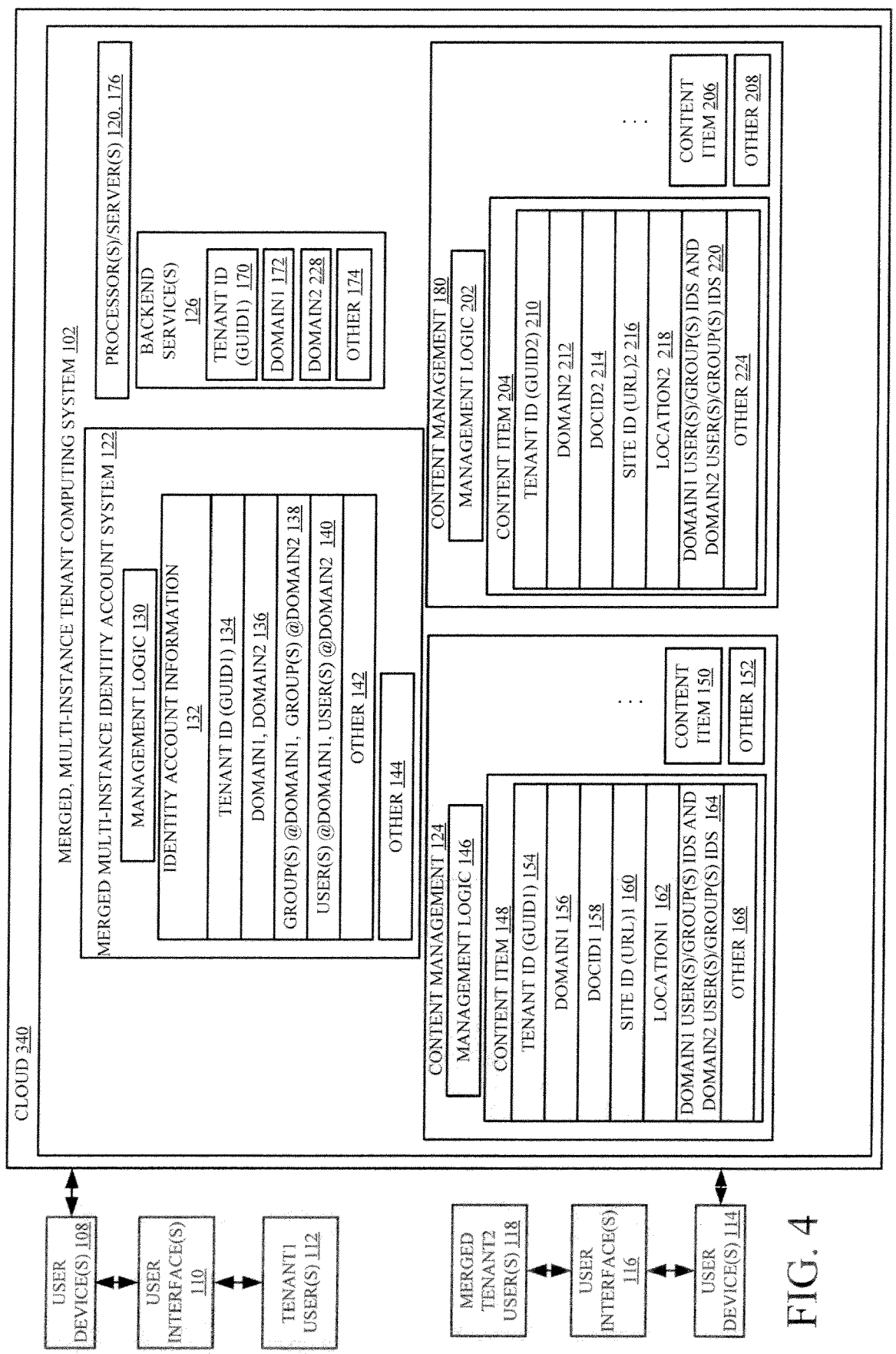
FIG. 4 is a block diagram showing one example of a tenant computing system with the two tenants illustrated in FIG. 1 merged into a multi-instance, single tenant computing system.

Referring for a moment to FIG. 4, FIG. 4 is a block diagram showing one example of a tenant computing system, after it has been merged. Some of the items are similar to those show in FIG. 1, and they are similarly numbered. FIG. 4 shows that the merged tenant computing system 340 includes a merged identity account system 342 as well as the content management systems 124 and 180, which have also been merged. At this point, merged identity account system 342 will be described.

Management logic 130 is similar to that described above with respect to FIG. 1. The identity account information 132 has now been modified. The domains include both Domain 1 and Domain 2 (which are those domains found in tenant computing system 102 and tenant computing system 104). The groups 138 include a superset of the user groups previously found on both tenant computing systems 102 and 104. Therefore, they include groups at Domain 1 and groups @ Domain 2. Similarly, the users include a superset of users previously identified in tenant computing systems 102 and 104. Therefore, they also include users @ Domain 1 and users @ Domain 2. It can thus be seen that the merged identity account system 342 now has all identities associated with the hub tenant (the tenant ID for tenant computing system 102 (GUID 1)). However, it maintains both domains and all users are identified within the merged tenant computing system 340, using their original unique user identifiers.

Returning again to the flow diagram illustrated in FIG. 3, once the directory (or identity account) has been successfully merged, then directory merger logic 250 automatically changes the MultiInstance state variable to "Re-association of the content is in progress." It generates a trigger to read only configuration logic 248 and generates a trigger to content merger logic 252. This trigger causes logic 248 to place the content items 204-206 in a read only state, and it initiates a re-association process by which content merger logic 252 re-associates all of the content items previously associated with tenant computing system 104 (the satellite instance), to tenant computing system 102 (the hub instance). Generating a content re-association trigger is indicated by block 346 in the flow diagram of FIG. 3, and placing the content in a read only state is indicated by block 347.

In response, re-association logic 266 begins to re-associate all of the content items of the satellite instance (tenant computing system 104) to the hub instance (tenant computing system 102). This is indicated by block 348. In doing so, it illustratively sets the tenant identifier for all satellite tenant content items to GUID 1 (the tenant identifier for the hub instance). This is indicated by block 350. It also illustratively maintains permissions for users and user groups within the content items unchanged and it maintains the site identifier for each of the content items unchanged. Therefore, users of tenant computing system 104 will be able to access those content items at the same site. It also illustratively leaves the document identifier for each content item unchanged. Thus, the users of tenant computing system 104 can find the content items using the same document identifiers. Maintaining the site and document identifiers unchanged is indicated by blocks 352 and 354 in the flow diagram of FIG. 3.

In addition, it will be noted that, in one example, the physical location of the content items is also unchanged. Therefore, they need not be physically relocated to a different data center, or to a different location within a single data center, or to any other different physical location. Maintaining the physical location of the content items unchanged is indicated by block 354 in the flow diagram of FIG. 3.

Also, in one example, re-association logic 266 sets the tenant ID corresponding to all backend services that support and enrich the content items to the tenant ID for the hub instance (GUID 1). This is indicated by block 356. The re-association of content items can include other things as well, and this is indicated by block 358.

Status checking logic 268 then checks to determine whether the content merger has been completed. This is indicated by block 360 in the flow diagram of FIG. 3. If not, it determines whether the merger failed as indicated by block 362. If the merger is not yet completed, but it has not failed, then processing reverts to block 348 where the content merger system continues to re-associate all of the content items of the satellite instance to the hub instance. However, if, at block 362, it is determined that the merger has failed, then processing continues at block 366 where notification/alert generation system 254 generates an error message and surfaces it for the global administrative user 276 on a user interface 272.

If, at block 260, it is determined that the content merger has been completed, then all users of both tenant computing systems can access one another, can visualize one another within the multi-instance, merged tenant computing system 340, and can share content with one another. This is indicated by block 364. Also, all pre-merger permissions are still intact, and still apply. Therefore, all of the users in the merged tenant computing system 340 have access to the same documents, under the same permission restrictions, as existed in the isolated tenant computing systems 102 and 104, before the merger into a multi-instance tenant. This is indicated by block 366. At some point, global administrative user 276 can either manually generate a notification and send it to the various users of the merged tenant computing system 340, that the merger is complete, or the notification can be sent automatically. Sending the notification is indicated by block 368 in the flow diagram of FIG. 3.

Referring again to FIG. 4, the merged tenant computing system 340 now illustratively includes the content management systems 124 and 180 from tenant computing systems 102 and 104, except that they are now merged into the multi-instance tenant. Therefore, both content items 148 and 204 have a tenant ID that is now associated with the hub instance (tenant computing system 102). Thus, in the example illustrated, the tenant ID in the content items of both content management systems is set to GUID 1. However, the domain 156 for content items in content management system 124 is maintained as Domain 1, the document ID 158 for content items is maintained as its pre-merged value (e.g., as Document ID 1) and the site ID (or URL) for content items is maintained as its pre-merged value (e.g., as Site ID (or URL) 1). Similarly, the physical location 162 is maintained as Location 1. However, the identified users and groups now include a superset of all users and groups from both Domain 1 and Domain 2 (e.g., from both the hub instance and the satellite instance). The service instance identifier 166 is maintained as Service Instance 1.

In the content management system 180, again, the content items are now associated with the tenant ID for the hub instance (GUID 1). However, the domain remains the same as does the document identifier, the site identifier and the physical location identifier. The users and groups, again, include a super-set of the users from both domains (e.g., from the users of the hub instance and the satellite instance) and the service instance identifier has now been changed to Service Instance 1. Thus, it can be seen that, all users and groups have access to all content items (of course, subject to the permissions that were previously set for those users). The users can access their content items using the same domain, site and document identifiers, and they are physically located at the same location.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one embodiment, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

FIG. 1 shows that the computing systems are disposed in a cloud computing architecture. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, they can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

It is also contemplated that some elements of computing systems described above can be disposed in cloud 106 while others are not. By way of example, data stores holding the directory information and content items can be disposed outside of cloud 106, and accessed through cloud 106. In another example, computing system 240 (or other items) can be outside of cloud 106. Regardless of where they are located, they can be accessed directly by different devices, through a network (either a wide area network or a local area network), they can be hosted at a remote site by a service, or they can be provided as a service through a cloud or accessed by a connection service that resides in the cloud. All of these architectures are contemplated herein.

It will also be noted that the architecture shown in FIG. 1, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 5:
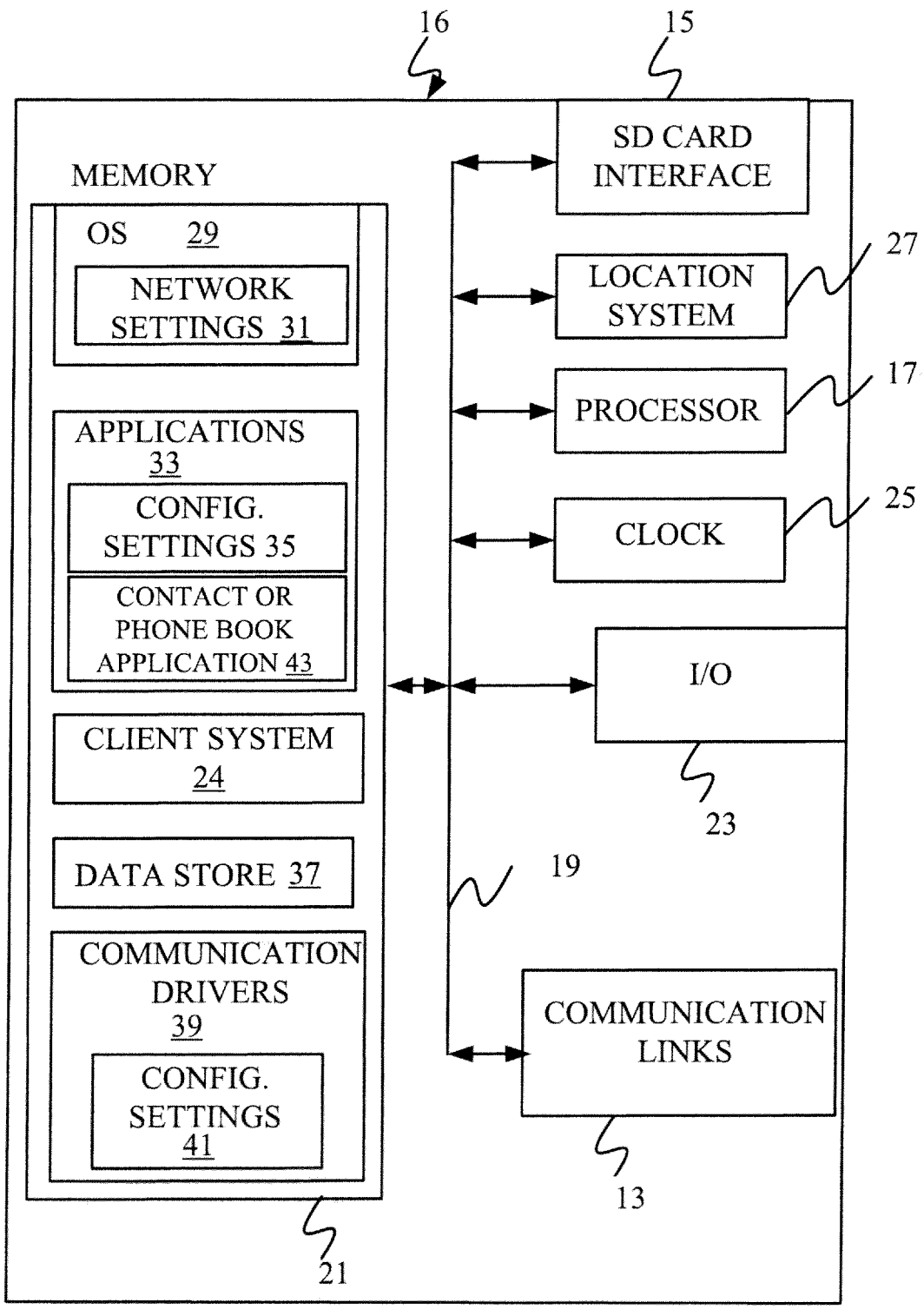
FIGS. 5-7 show examples of mobile devices that can be used in the architectures shown in the previous figures.
Figure 6:
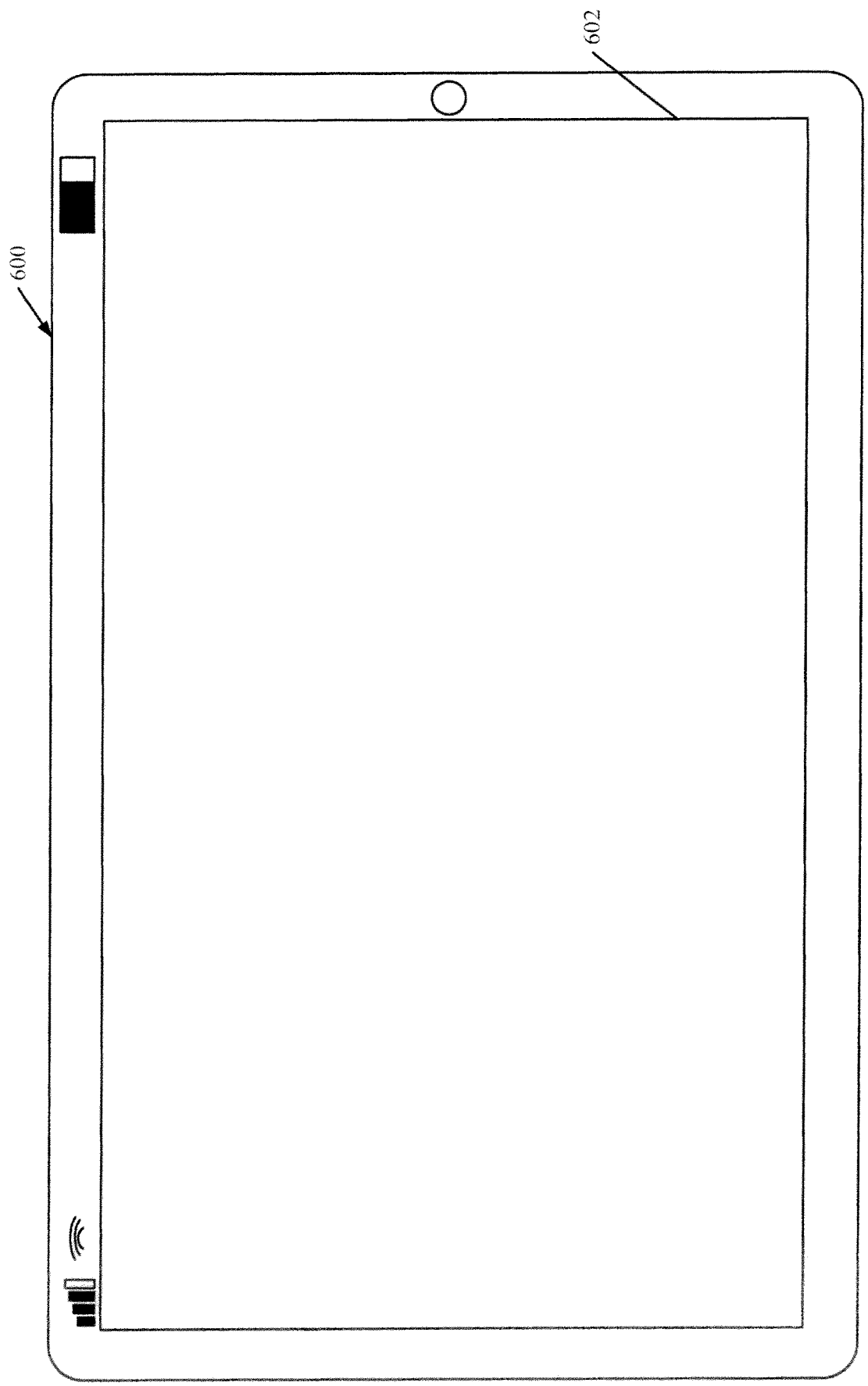
Figure 7:
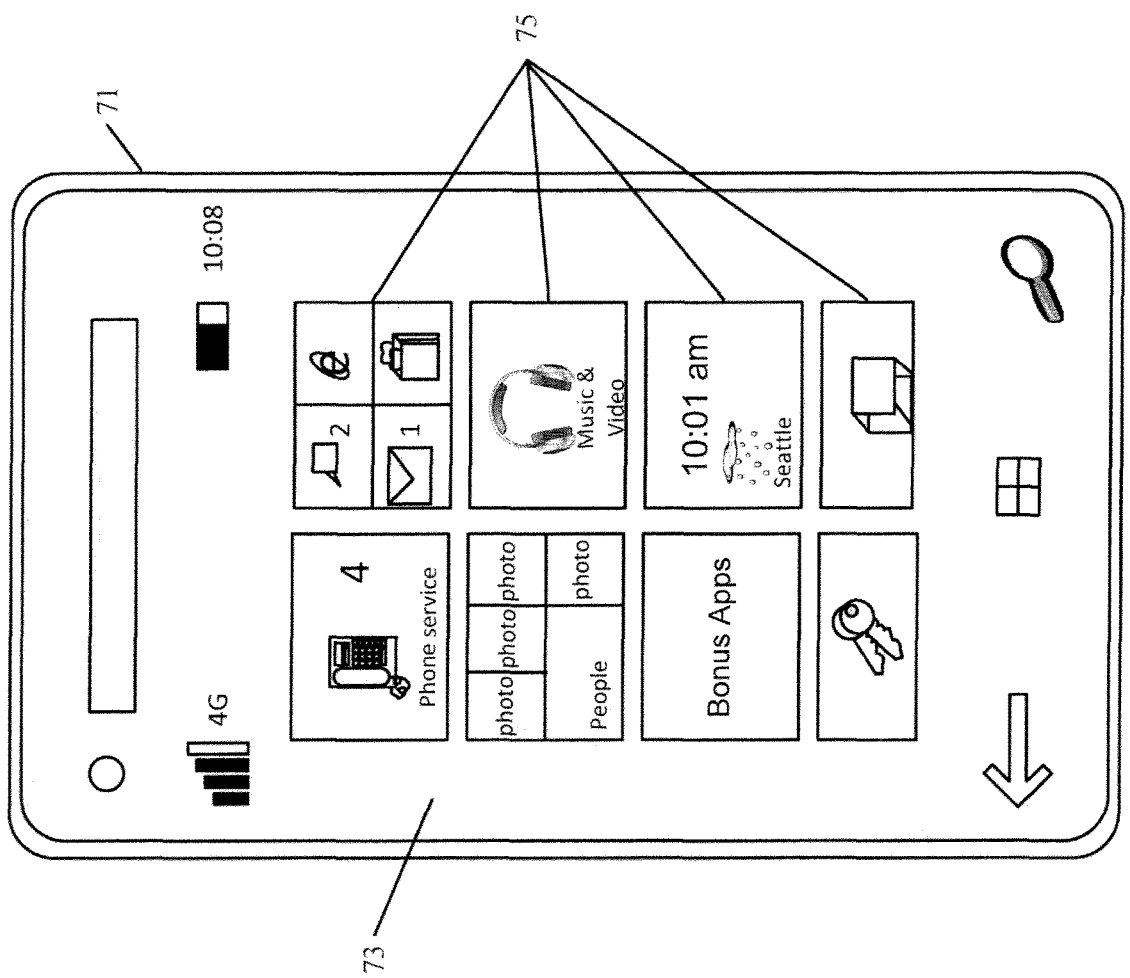

FIG. 5 is a simplified block diagram of one illustrative example of a handheld or mobile computing device that can be used as a user's or client's hand held device 16, in which the present system (or parts of it) can be deployed. FIGS. 6-7 are examples of handheld or mobile devices.

FIG. 5 provides a general block diagram of the components of a client device 16 that can run components the computing systems described above or that interacts with them, or both. In the device 16, a communications link 13 is provided that allows the handheld device to communicate with other computing devices and under some embodiments provides a channel for receiving information automatically, such as by scanning. Examples of communications link 13 include an infrared port, a serial/USB port, a cable network port such as an Ethernet port, and a wireless network port allowing communication though one or more communication protocols including General Packet Radio Service (GPRS), LTE, HSPA, HSPA+ and other 3G and 4G radio protocols, 1xrtt, and Short Message Service, which are wireless services used to provide cellular access to a network, as well as Wi-Fi protocols, and Bluetooth protocol, which provide local wireless connections to networks.

In other examples, applications or systems are received on a removable Secure Digital (SD) card that is connected to a SD card interface 15. SD card interface 15 and communication links 13 communicate with a processor 17 (which can also embody processors or servers from other FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, multi-touch sensors, optical or video sensors, voice sensors, touch screens, proximity sensors, microphones, tilt sensors, and gravity switches and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Similarly, device 16 can have a client system 24 which can run various applications or embody parts or all of architecture 100. Processor 17 can be activated by other components to facilitate their functionality as well.

Examples of the network settings 31 include things such as proxy information, Internet connection information, and mappings. Application configuration settings 35 include settings that tailor the application for a specific enterprise or user. Communication configuration settings 41 provide parameters for communicating with other computers and include items such as GPRS parameters, SMS parameters, connection user names and passwords.

Applications 33 can be applications that have previously been stored on the device 16 or applications that are installed during use, although these can be part of operating system 29, or hosted external to device 16, as well.

FIG. 6 shows one example in which device 16 is a tablet computer 600. In FIG. 6, computer 600 is shown with user interface display screen 602. Screen 602 can be a touch screen (so touch gestures from a user's finger can be used to interact with the application) or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 7 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

Figure 8:
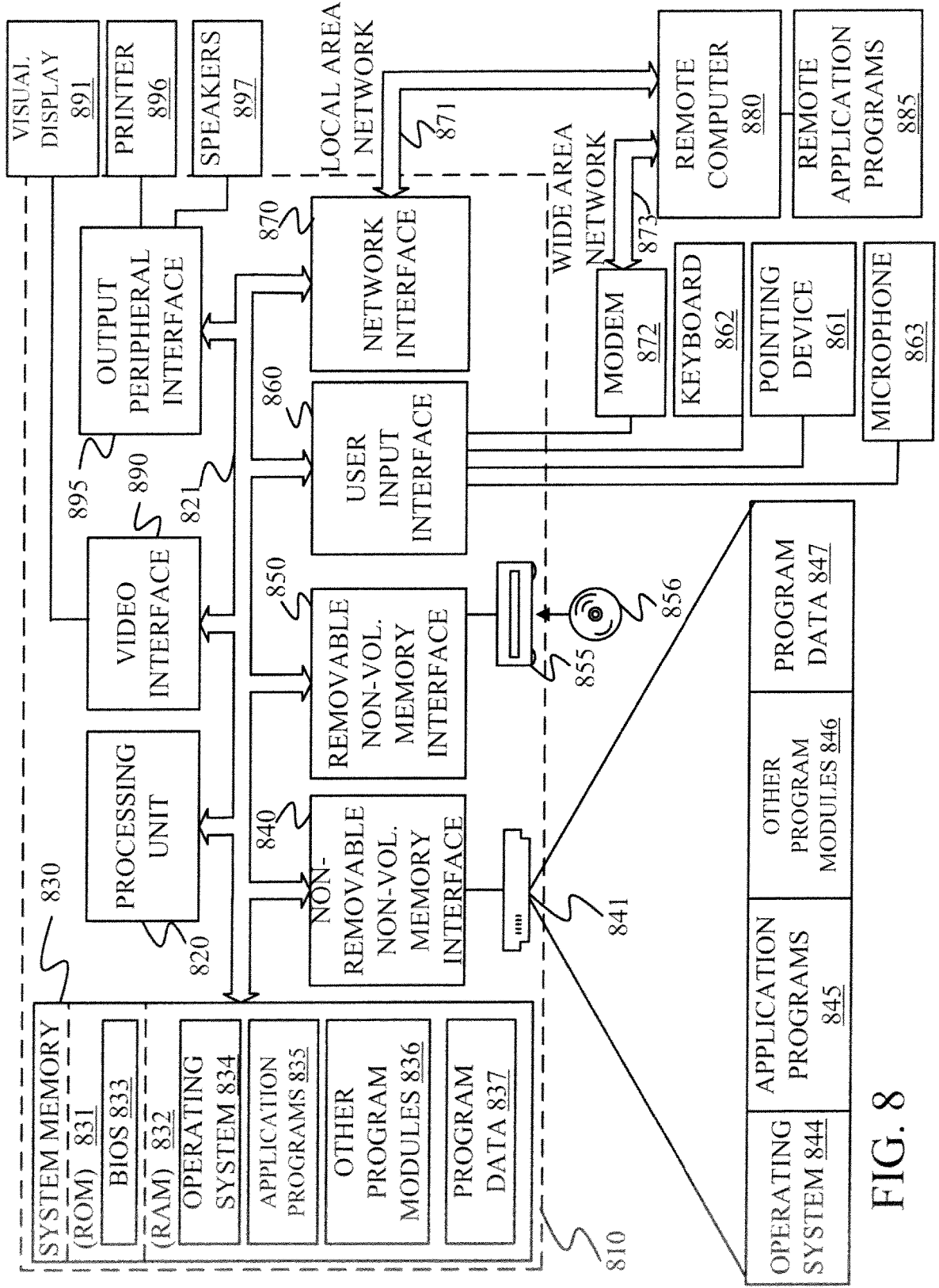
FIG. 8 is a block diagram showing one example of a computing environment that can be used in the architectures shown in the previous figures.

FIG. 8 is one example of a computing environment in which the architecture shown above, or parts of it, (for example) can be deployed. With reference to FIG. 8, an example system for implementing some embodiments includes a general-purpose computing device in the form of a computer 810. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to FIG. 1 can be deployed in corresponding portions of FIG. 8.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 8 illustrates operating system 834, application programs 835, other program modules 836, and program data 837.

The computer 810 may also include other removable/non-removable volatile/nonvolatile computer storage media. By way of example only, FIG. 8 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 8, provide storage of computer readable instructions, data structures, program modules and other data for the computer 810. In FIG. 8, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 10 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 8 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computing system, comprising:

directory merger logic configured to generate a multi-instance identity account system that identifies identities in a first instance of a tenant in a hosted service and identities in a second instance of the tenant in the hosted service, by associating the identities in the first instance and the identities in the second instance with a common tenant identifier (tenant ID) in the multi-instance identity account system, and wherein the first instance corresponds to a first domain in the multi-instance identity account system and the second instance corresponds to a second domain in the multi-instance identity account system;

directory status checking logic configured to detect when the multi-instance identity account system is completed and to, in response, generate a content merger trigger signal; and content merger logic configured to detect the content merger trigger signal and to, in response, associate content items for both the first instance and the second instance with the common tenant ID and with the identities in both the first and second instances.

Example 2 is the computing system of any or all previous examples wherein the first instance of the tenant in the hosted service corresponds to a first tenant having the first domain in the hosted service and wherein the second instance of the tenant corresponds to a second tenant having the second domain in the hosted service, the first and second tenants being isolated from one another in the hosted service by having the identities and content items in the first tenant associated with a tenant ID corresponding to the first tenant and the identities and content items in the second tenant being associated with a tenant ID corresponding to the second tenant, prior to the directory merger logic generating the multi-instance identity account system and prior to the content merger logic associating the content items with the common tenant ID.

Example 3 is the computing system of any or all previous examples and further comprising:

instance update logic configured to expose an interface that receives hub instance update settings indicating which of the first and second tenants is a hub instance and which of the first and second tenants is a satellite instance.

Example 4 is the computing system of any or all previous examples wherein the instance update logic detects the hub instance update settings indicating that the first tenant corresponds to the hub instance and the second tenant corresponds to the satellite instance.

Example 5 is the computing system of any or all previous examples wherein the directory merger logic is configured to re-associate the identities in the second tenant with the tenant ID corresponding to the first tenant, as the common tenant ID.

Example 6 is the computing system of any or all previous examples wherein the content merger logic is configured to re-associate the content items in the second tenant with the tenant ID corresponding to the first tenant, as the common tenant ID, to obtain re-associated content items.

Example 7 is the computing system of any or all previous examples wherein the identities in the second tenant include users of the second tenant, each user having a unique user identifier, and wherein the directory merger logic is configured to re-associate the users of the second tenant with the common tenant ID, to obtain re-associated users, while maintaining the unique user identifier for each user.

Example 8 is the computing system of any or all previous examples and further comprising:

management logic configured to apply a same set of permissions to grant access by re-associated users to re-associated content items as was applied to grant access by users of the second tenant to content items in the second tenant, based on the unique user identifier corresponding to each user of the second tenant.

Example 9 is the computing system of any or all previous examples wherein each content item in the second tenant has a corresponding content item identifier, domain, uniform resource locator, and physical location identifier, and wherein the content merger logic is configured to re-associate the content items while maintaining the content item identifier corresponding to each content item unchanged.

Example 10 is the computing system of any or all previous examples wherein the content merger logic is configured to re-associate the content items while maintaining the domain corresponding to each content item unchanged.

Example 11 is the computing system of any or all previous examples wherein the content merger logic is configured to re-associate the content items while maintaining the uniform resource locator corresponding to each content item unchanged.

Example 12 is the computing system of any or all previous examples wherein the content merger logic is configured to re-associate the content items while maintaining the physical location corresponding to each content item unchanged.

Example 13 is a computer implemented method, comprising:

generating a multi-instance identity account system that identifies users and user groups in a first instance of a tenant in a hosted service and users and user groups in a second instance of the tenant in the hosted service, by associating the users and user groups in the first instance and the users and user groups in the second instance with a common tenant identifier (tenant ID) in the multi-instance identity account system, and wherein the first instance corresponds to a first domain in the multi-instance identity account system and the second instance corresponds to a second domain in the multi-instance identity account system;

detecting when the multi-instance identity account system is completed;

in response to detecting that the multi-instance identity account system is completed, generating a content merger trigger signal; and detecting the content merger trigger signal; and in response to detecting the content merger signal, associating content items for both the first instance and the second instance with the common tenant ID and with the users and user groups in both the first and second instances.

Example 14 is the computer implemented method of any or all previous examples wherein the first instance of the tenant in the hosted service corresponds to a first tenant having the first domain in the hosted service and wherein the second instance of the tenant corresponds to a second tenant having the second domain in the hosted service, the first and second tenants being isolated from one another in the hosted service by having the users, user groups, and content items in the first tenant associated with a tenant ID corresponding to the first tenant and the users, user groups, and content items in the second tenant being associated with a tenant ID corresponding to the second tenant, prior to generating the multi-instance identity account system and prior to associating the content items with the common tenant ID.

Example 15 is the computer implemented method of any or all previous examples and further comprising:

exposing an instance settings interface; and detecting, through the instance settings interface, instance update settings indicating the first tenant is a hub instance and the second tenant is a satellite instance, Example 16 is the computer implemented method of any or all previous examples wherein associating the users and user groups of the first and second tenants with a common tenant ID comprises:

re-associating the users and user groups in the second tenant with the tenant ID corresponding to the first tenant to obtain re-associated users and user groups, and wherein associating content items in both the first instance and the second instance with the common tenant ID comprises re-associating the content items in the second tenant with the tenant ID corresponding to the first tenant, to obtain re-associated content items.

Example 17 is the computer implemented method of any or all previous examples wherein the users of the second tenant each have a unique user identifier, and wherein re-associating the users of the second tenant with the common tenant ID comprises maintaining the unique user identifier for each user.

Example 18 is the computer implemented method of any or all previous examples and further comprising:

applying a same set of permissions to grant access by re-associated users to re-associated content items as was applied to grant access by users of the second tenant to content items in the second tenant, based on the unique user identifier corresponding to each user of the second tenant.

Example 19 is the computer implemented method of any or all previous examples wherein each content item in the second tenant has a corresponding content item identifier, domain, uniform resource locator, and physical location identifier, and wherein re-associating the content items comprises re-associating the content items while maintaining the content item identifier, domain, uniform resource locator and physical location corresponding to each content item unchanged.

Example 20 is a computing system for merging a first tenant having a first domain and having identities and content items associated with a first tenant identifier (ID) in a hosted service and a second tenant having a second domain and having identities and content items associated with a second tenant ID in the hosted service, the computing system comprising:

directory merger logic configured to generate a multi-instance identity account system that identifies identities in a first instance of a tenant in a hosted service and identities in a second instance of the tenant in the hosted service, by re-associating, in the multi-instance identity account system, the identities in the second tenant instance with the tenant ID corresponding to the first tenant;

directory status checking logic configured to detect when the multi-instance identity account system is completed and to, in response, generate a content merger trigger signal; and content merger logic configured to detect the content merger trigger signal and to, in response, re-associate the content items for the second tenant with the tenant ID corresponding to the first tenant and with the identities in both the first and second tenants.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing system, comprising:
at least one processor; and
memory storing instructions executable by the at least one processor, wherein the instructions, when executed, cause the computing system to:
generate a multi-instance identity account system that identifies identities in a first instance of a tenant in a hosted service and identities in a second instance of the tenant in the hosted service, by associating the identities in the first instance and the identities in the second instance with a common tenant identifier (tenant ID) in the multi-instance identity account system, and wherein the first instance corresponds to a first domain in the multi-instance identity account system and the second instance corresponds to a second domain in the multi-instance identity account system;
detect when the multi-instance identity account system is completed and to, in response, generate a content merger trigger signal;
detect the content merger trigger signal; and
in response to the content merger trigger signal, associate content items for both the first instance and the second instance with the common tenant ID and with the identities in both the first and second instances.

2. The computing system of claim 1 wherein the first instance of the tenant in the hosted service corresponds to a first tenant having the first domain in the hosted service and wherein the second instance of the tenant corresponds to a second tenant having the second domain in the hosted service, the first and second tenants being isolated from one another in the hosted service by having the identities and content items in the first tenant associated with a tenant ID corresponding to the first tenant and the identities and content items in the second tenant being associated with a tenant ID corresponding to the second tenant, prior to generation of the multi-instance identity account system and prior to the association of the content items with the common tenant ID.

3. The computing system of claim 2 wherein the instructions cause the computing system to:
expose an interface that receives hub instance update settings indicating which of the first and second tenants is a hub instance and which of the first and second tenants is a satellite instance.

4. The computing system of claim 3 wherein the instructions cause the computing system to detect the hub instance update settings indicating that the first tenant corresponds to the hub instance and the second tenant corresponds to the satellite instance.

5. The computing system of claim 4 wherein the instructions cause the computing system to re-associate the identities in the second tenant with the tenant ID corresponding to the first tenant, as the common tenant ID.

6. The computing system of claim 5 wherein the instructions cause the computing system to re-associate the content items in the second tenant with the tenant ID corresponding to the first tenant, as the common tenant ID, to obtain re-associated content items.

7. The computing system of claim 6 wherein the identities in the second tenant include users of the second tenant, each user having a unique user identifier, and wherein the instructions cause the computing system to:
re-associate the users of the second tenant with the common tenant ID; and
obtain re-associated users, while maintaining the unique user identifier for each user.

8. The computing system of claim 7 wherein the instructions, when executed, cause the computing system to:
apply a same set of permissions to grant access by re-associated users to re-associated content items as was applied to grant access by users of the second tenant to content items in the second tenant, based on the unique user identifier corresponding to each user of the second tenant.

9. The computing system of claim 8 wherein each content item in the second tenant has a corresponding content item identifier, domain, uniform resource locator, and physical location identifier, and wherein the instructions cause the computing system to:
re-associate the content items while maintaining the content item identifier corresponding to each content item unchanged.

10. The computing system of claim 9 wherein the instructions cause the computing system to:
re-associate the content items while maintaining the domain corresponding to each content item unchanged.

11. The computing system of claim 10 wherein the instructions cause the computing system to:
re-associate the content items while maintaining the uniform resource locator corresponding to each content item unchanged.

12. The computing system of claim 11 wherein the instructions cause the computing system to:
re-associate the content items while maintaining the physical location corresponding to each content item unchanged.

13. A computer implemented method, comprising:
generating a multi-instance identity account system that identifies users and user groups in a first instance of a tenant in a hosted service and users and user groups in a second instance of the tenant in the hosted service, by associating the users and user groups in the first instance and the users and user groups in the second instance with a common tenant identifier (tenant ID) in the multi-instance identity account system, and wherein the first instance corresponds to a first domain in the multi-instance identity account system and the second instance corresponds to a second domain in the multi-instance identity account system;

detecting when the multi-instance identity account system is completed;

in response to detecting that the multi-instance identity account system is completed, generating a content merger trigger signal; and detecting the content merger trigger signal; and in response to detecting the content merger signal, associating content items for both the first instance and the second instance with the common tenant ID and with the users and user groups in both the first and second instances.

14. The computer implemented method of claim 13 wherein the first instance of the tenant in the hosted service corresponds to a first tenant having the first domain in the hosted service and wherein the second instance of the tenant corresponds to a second tenant having the second domain in the hosted service, the first and second tenants being isolated from one another in the hosted service by having the users, user groups, and content items in the first tenant associated with a tenant ID corresponding to the first tenant and the users, user groups, and content items in the second tenant being associated with a tenant ID corresponding to the second tenant, prior to generating the multi-instance identity account system and prior to associating the content items with the common tenant ID.

15. The computer implemented method of claim 14 and further comprising:

exposing an instance settings interlace; and detecting, through the instance settings interface, instance update settings indicating the first tenant is a hub instance and the second tenant is a satellite instance.

16. The computer implemented method of claim 15 wherein associating the users and user groups of the first and second tenants with a common tenant ID comprises:

re-associating the users and user groups in the second tenant with the tenant ID corresponding to the first tenant to obtain re-associated users and user groups, and wherein associating content items in both the first instance and the second instance with the common tenant ID comprises re-associating the content items in the second tenant with the tenant ID corresponding to the first tenant, to obtain re-associated content items.

17. The computer implemented method of claim 16 wherein the users of the second tenant each have a unique user identifier, and wherein re-associating the users of the second tenant with the common tenant ID comprises maintaining the unique user identifier for each user.

18. The computer implemented method of claim 17 and further comprising:

applying a same set of permissions to grant access by re-associated users to re-associated content items as was applied to grant access by users of the second tenant to content items in the second tenant, based on the unique user identifier corresponding to each user of the second tenant.

19. The computer implemented method of claim 18 wherein each content item in the second tenant has a corresponding content item identifier, domain, uniform resource locator, and physical location identifier, and wherein re-associating the content items comprises re-associating the content items while maintaining the content item identifier, domain, uniform resource locator and physical location corresponding to each content item unchanged.

20. A computing system for merging a first tenant having a first domain and having identities and content items associated with a first tenant identifier (ID) in a hosted service and a second tenant having a second domain and having identities and content items associated with a second tenant ID in the hosted service, the computing system comprising:

at least one processor; and memory storing instructions executable by the at least one processor, wherein the instructions, when executed, provide:

directory merger logic configured to generate a multi-instance identity account system that identifies identities in a first instance of a tenant in a hosted service and identities in a second instance of the tenant in the hosted service, by re-associating, in the multi-instance identity account system, the identities in the second tenant instance with the tenant II) corresponding to the first tenant;

directory status checking logic configured to detect when the multi-instance identity account system is completed and to, in response, generate a content merger trigger signal; and content merger logic configured to detect the content merger trigger signal and to, in response, re-associate the content items for the second tenant with the tenant ID corresponding to the first tenant and with the identities in both the first and second tenants.

\* \* \* \* \*